United States Patent

Pizzacalla et al.

[11] Patent Number: 6,003,542
[45] Date of Patent: Dec. 21, 1999

[54] AUTOMATIC SHUTOFF VALVE

[76] Inventors: Dominic Pizzacalla, 1445 Sandhurst Place West Van, British Columbia, Canada, V7T 1B9; Alastair Knott, 1501-283 Davie St., British Columbia, Canada, J6B 5T6

[21] Appl. No.: 08/535,189

[22] PCT Filed: Apr. 26, 1994

[86] PCT No.: PCT/CA94/00231

§ 371 Date: Jan. 2, 1996

§ 102(e) Date: Jan. 2, 1996

[87] PCT Pub. No.: WO94/25393

PCT Pub. Date: Nov. 10, 1994

[51] Int. Cl.$^6$ .............................. B67D 1/04; B67D 1/12; B67D 5/34; F16K 31/22
[52] U.S. Cl. .................... 137/397; 137/210; 137/212; 137/399; 137/410; 137/433; 141/198; 222/66; 222/67; 222/400.7
[58] Field of Search ..................... 137/391, 395, 137/396, 397, 398, 399, 410, 430, 433, 209, 210, 212; 222/66, 67, 400.7; 141/198

[56] References Cited

U.S. PATENT DOCUMENTS

| 3,587,927 | 6/1971 | Stott | 222/66 |
| 3,945,536 | 3/1976 | Doak | 222/66 |
| 4,096,879 | 6/1978 | Serur et al. | 137/433 |
| 4,203,463 | 5/1980 | Ponlot et al. | 137/433 |
| 4,269,222 | 5/1981 | Palti | 137/433 |

*Primary Examiner*—George L. Walton

[57] ABSTRACT

An automatic shut-off valve for regulating the flow of beer or other liquid from its container, whereby a float is kept away from the outlet by directing some of the liquid upwardly against the float while most of the liquid is being discharged. The discharge of liquid is usually accompanied by a suction about the outlet which tends to suck the float downwardly to seal the outlet prematurely. By the present valve and the location of the float during discharge of liquid, premature sealing is minimized.

7 Claims, 4 Drawing Sheets

AUTOMATIC SHUTOFF VALVE

BACKGROUND OF THE INVENTION

This invention relates to automatic shutoff valves, particularly of the type used for beer dispensers.

The dispensing of beer, as well as similar operations for soft drinks and other liquids, employs compressed gases, carbon dioxide in the case of beer and soft drinks. Typically there is a large container, such as a beer keg, containing liquid. A tube extends from the top of the container to near the bottom thereof. There is a special coupling at the top of the container which admits the pressurized gas and allows the liquid to be discharged from the tube. In the case of beer, the coupling is typically connected to a tap at the bar by means of a long hose.

Problems are encountered however when the container is empty or near empty. Eventually the level of liquid drops below the bottom of the tube in the container. This causes gas to be forced out the tube, through the hose and to the tap at the bar. The container is then replaced with a full keg of beer or the like, but foaming occurs until the hose has been purged of gas by a fresh supply of liquid. This causes a considerable loss of time at the bar in pouring out the foam and wastage of beer which has been converted to the foam.

Automatic shutoff valves has been devised to stop the flow of fluids from the container once the supply of beer or other liquid in the container has been exhausted. An example of such a valve is found in the U.S. Pat. No. 3,587,927 to Stott. These valves include a chamber, typically a transparent one, which has a float therein. There is a valve member on the bottom of the float. There is an opening in the chamber for admitting liquid from the container. The valve has an outlet for the liquid which is connected to an opening located in a valve seat at the bottom of the chamber. When the chamber is full of liquid, the float rises above the bottom of the chamber, allowing the liquid to be discharged through the opening at the bottom of the chamber toward the outlet. However, when gas is received from the container into the chamber, the float is no longer supported and drops, allowing the valve member to close the opening and preventing further fluid (gas or liquid) from being discharged from the valve.

However, certain problems have been encountered with prior art automatic shutoff valves of this type. Often these valves seem to work satisfactorily when used only intermittently. However, under some conditions they have been found to stop functioning satisfactorily, preventing an outflow of liquid from the container even when the container is not empty. These problems usually arise when the liquid is dispensed quickly and repeatedly. This occurs, for example, in bars dispensing high quantities of beer.

One reason why this has occurred is that, under the conditions discussed above, the float can be sucked down towards the valve seat, causing the valve member to close off the valve seat and stopping the flow of liquid. This can occur, for example, when the flow of liquid is repeatedly stopped and started, for example due to turning the tap on and off at the bar in the case of beer dispensers. It is believed that this practice causes the float to bob up and down. The inertia of the float in the downward direction, together with the suction created by the liquid being discharged from the bottom of the chamber, can bring the float close enough to the valve seat so the valve member becomes jammed therein. Once this occurs, the pressure of liquid entering the chamber from the container keeps the valve member in place and prevents a further outflow of beer or other liquid.

In order to alleviate this problem, it has become a practice to make the chambers of the valves vertically elongated such that the float floats well above the valve seat and the discharge opening during normal operation. In this way, the valve member does not come close enough to the valve seat to be sucked into it.

However this has lead to another problem. These relatively long automatic shutoff valves are then too high to fit under many counters, for example, when installed on the top of a beer keg. Moreover, they are subject to damage when connected to a keg of beer, or other container, if installed thereon. Accordingly, many such automatic valves are mounted at a position remote from the container, such as on a wall, and connected to the container by a hose. This is disadvantageous because it means that gas can fill this hose before the flow of liquid is stopped by the automatic shutoff valve. When the keg of beer, or other container, is replaced, the gas in this hose must still be purged before normal dispensing can recommence.

SUMMARY OF THE INVENTION

Accordingly, it is an object of the invention to provide an improved automatic shutoff valve for beer kegs or the like which overcomes the deficiencies and problems associated with the prior art.

It is also an object of the invention to provide an improved automatic shutoff valve for beer kegs or the like which inhibits the valve from stopping an outflow of liquid during normal operation.

It is a further object of the invention to provide an improved automatic shutoff valve of this type which has a relatively low height and therefore can be conveniently mounted directly on the tops of kegs of beer or other such containers.

It is still a further object of the invention to provide an improved automatic shutoff valve which is simple in construction, economical to produce and reliable in operation.

In accordance with these objects, there is provided an automatic shutoff valve of the type having a body with an inlet, an outlet and an interior chamber. The chamber has a top and a bottom with an opening on the bottom. The outlet communicates with the opening. There is a float within the chamber. The float has a valve member configured to close the opening when the float is at the bottom of the chamber. The valve is characterized by means for directing a flow of liquid from the valve onto the float and towards the top of the chamber. For example, the means may include a conduit extending from the inlet into the chamber and having a discharge end adjacent to the float.

The conduit may include a tube within the chamber extending from the bottom thereof towards the top thereof. The discharge end is at the top end of the tube and preferably is angled towards the float.

The float may also have a portion opposite the discharge end of the conduit which is positioned to be in a stream of fluid discharged therefrom. The portion of the float may be a flange thereon. For example, where the float is cylindrical, the flange may be annular.

DESCRIPTION OF THE PREFERRED EMBODIMENTS

Figure 1:
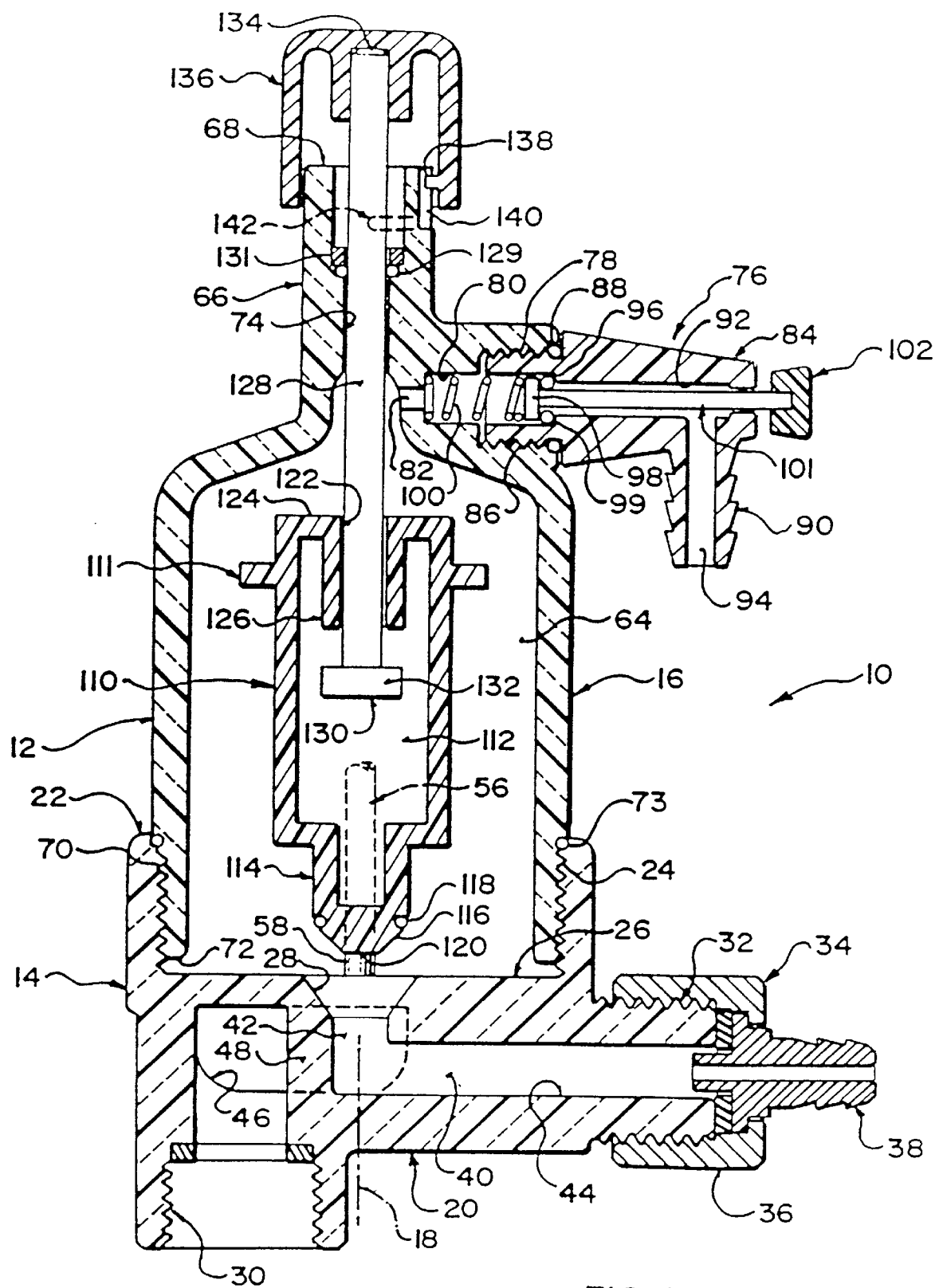
FIG. 1 is a longitudinal section of an automatic shutoff valve according to an embodiment of the invention.

Referring to FIG. 1 this shows an automatic shutoff valve 10 which includes a body 12 including a mounting member 14 and a hollow, cylindrical portion 16. The mounting member has a center 18, a bottom 20 and a top 22. There is a female threaded recess 24 at the top thereof. The recess has a bottom 26. A downwardly tapering valve seat 28 is located on the bottom of the recess at the center of the member.

The mounting member has a female threaded inlet connector 30 on bottom 20 and to a first side thereof, which is the left side from the point of view of FIG. 1. This female connector 30 is used to connect the valve to a source of liquid such as to a keg of beer. The mounting member 14 also has a male threaded outlet connector 32 used to connect the valve to a supply line leading to a mechanism for discharging the liquid from the container, such as a tap at a bar in the case of beer.

In this example a female connector 34 is shown releasably connected to the male connector 32. The connector 34 includes a nut 36 rotatably received on a hose connector 38 in the conventional manner. There is a first passageway 40 extending from the valve seat 28 to the outlet connector 32. This includes a first portion 42 extending downwardly from the valve seat at the center of the member and a second portion 44 extending radially outwards to the outlet connector 32.

Figure 3:
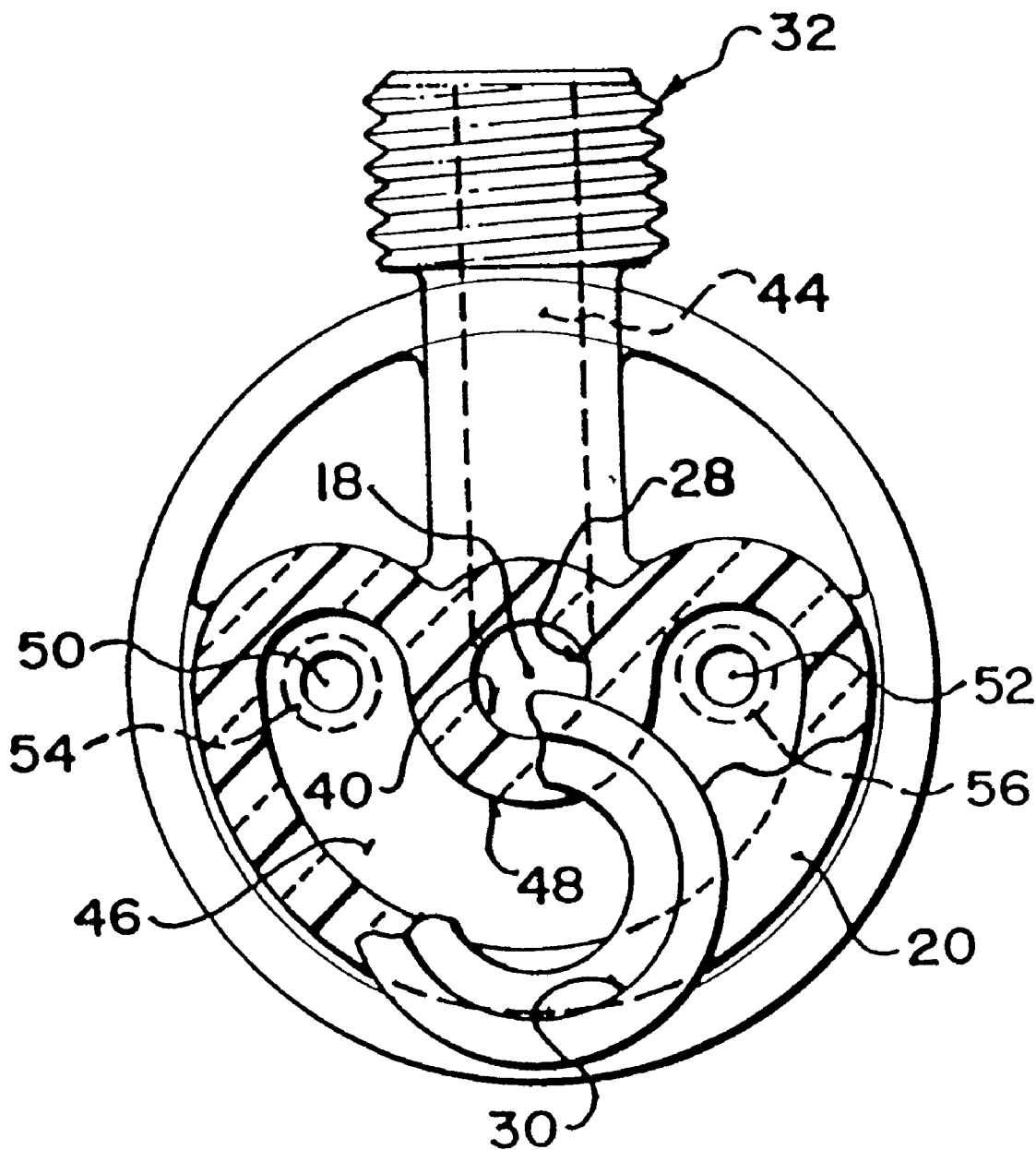
FIG. 3 is a bottom plan of the valve, partly broken away.

The mounting member 14 also includes a second passageway 46 which extends through the member from the inlet connector 30. This passageway is curved about the center 18 of the member and the valve seat 28 as seen in FIG. 3. The second passageway is separated from the first passageway 40 by curved wall 48 shown in FIG. 1 and FIG. 3.

There are two openings 50 and 52 on the bottom 26 of the recess as shown best in FIG. 3. These openings are on opposite sides of the valve seat and are spaced-apart therefrom. The passageway 46 extends from the inlet connector 30 about the center of the member to each of these openings.

Figure 2:
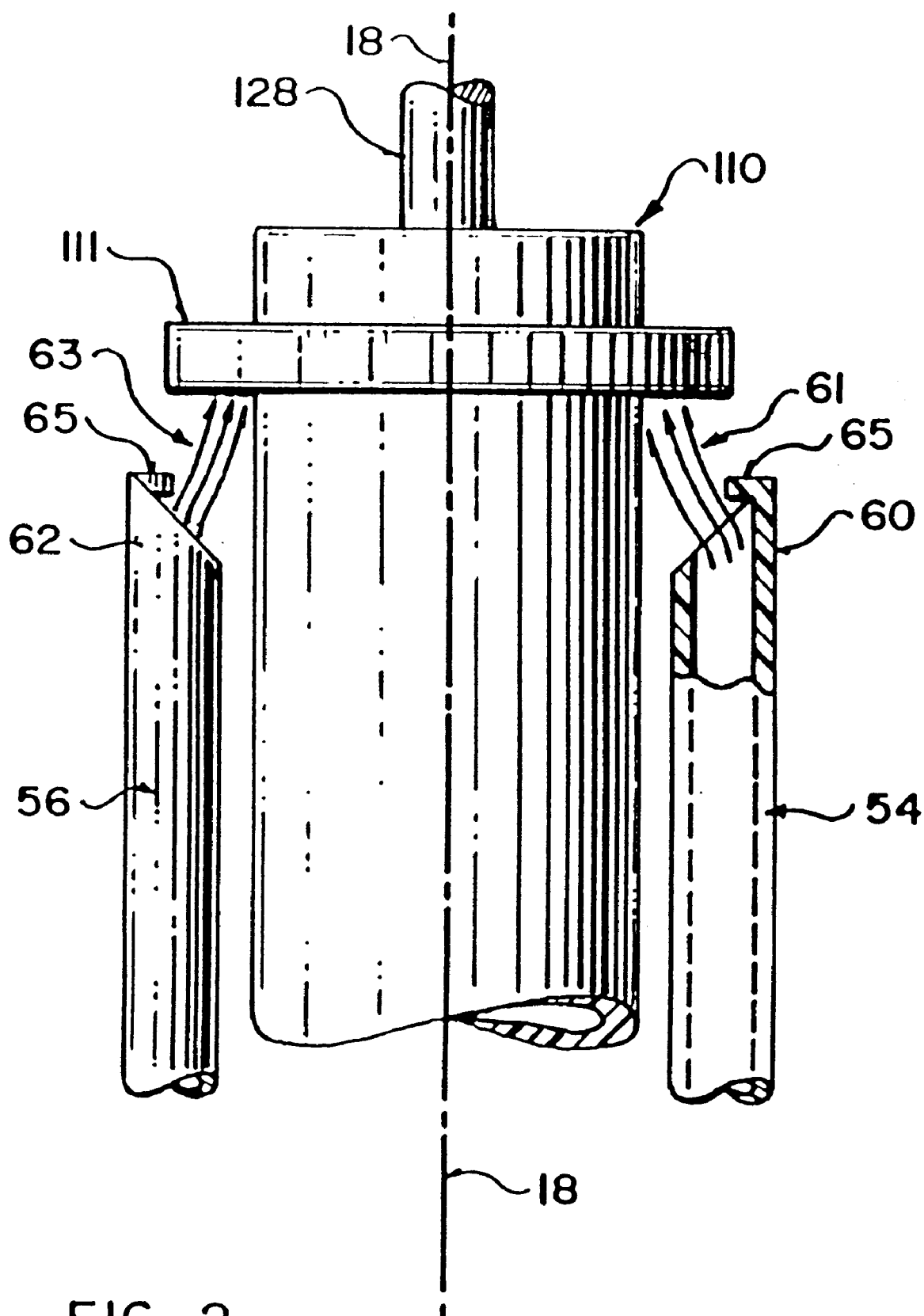
FIG. 2 is a fragmentary elevation of the float and the discharge tubes thereof.

A pair of discharge tubes 54 and 56, shown best in FIG. 2, extend perpendicularly upwards from the bottom 26 of the recess from the openings 50 and 52. These tubes have bottom ends, for example bottom end 58 of tube 56 shown in FIG. 1, which are connected to the bottom 26 of the recess 24. The tubes are on opposite sides of the valve seat 28 and have tops 62 and 60 angled towards the center 18 of the mounting member as seen in FIG. 2. The tops serve to discharge liquid entering the valve from the connector 30. The tops of the tubes each have a deflector plate 65 which extends inwardly from the outside of each tube part way towards the inside. In this example each deflector plate extends about ⅓ the distance across the inside of each tube. The deflector plates are generally semi-circular in shape when seen from above.

The portion 16 of body 12 of this embodiment is preferably transparent for visual check on its contents. It is made of a food grade polymer, for example. The portion 16 has a chamber 64 therein which is generally cylindrical, having a narrow neck 66 adjacent top 68 thereof. There is a male threaded portion 70 adjacent bottom 72 of this portion of the body which is threadedly and releasably secured to the female threaded recess 24 of the mounting member. An O-ring 73 is compressed therebetween to provide adequate sealing. There is a longitudinal bore or opening 74 in the neck 66. There is also a manually operable vent 76 at the top of this portion of the body on the side of the neck 66. The vent includes a female fitting 78 on the side of the neck and a bore 80, of a reduced section, extending inwardly from the female fitting. A passageway 82 extends from the bore to the chamber 64. The vent includes a valve body 84 with a male threaded end 86 threadedly received in the female fitting 78. An O-ring 88 is compressed between the valve body and the female fitting for sealing purposes.

There is a hose fitting 90 extending downwardly from the valve body 84. There is a first passageway 92 extending through the valve body which is aligned with bore 80. There is another passageway 94 extending from passageway 92 through the hose fitting 90.

There is a valve seat 96 within the valve body along passageway 92. A valve member 98, a disk in this example, is normally biased towards the valve seat 96 by a coil spring 100 located within the bore 80. The valve member 98 is connected to a shaft 101 extending slidably through passageway 92 with a button 102 on the opposite end thereof exterior to the valve body 84. An O-ring 99 is located between the valve member 98 and the valve seat 96 for sealing purposes.

There is a float 110 received within chamber 64 which is free to move up and down depending upon the liquid level within the chamber. In this example the float is generally cylindrical with a hollow interior 112. In this example the float has a bottom projection 114 which is also cylindrical, but of reduced section. A conical valve member 116, equipped with an O-ring 118, is located at the bottom 120 of the float. The float in this example is of a material with a lower specific gravity then the liquid, such as polyethylene for beer.

The float has the bore or opening 122 on top 124 thereof which extends through an interior sleeve 126. A guide shaft 128 extends slidably through the opening 122 into the interior 112 of the float. The shaft 128 also extends slidably and sealingly through the opening 74 in the neck of the portion 16 of body 12. There is an 0-ring 129 and a plastic retainer ring 131 to provide the sealing. The shaft extends along the center line of the body, which is vertical from the point of view of FIG. 1, the operational position of the valve, and through center 18 of the mounting member 14. The shaft 128 keeps the float centered so that the valve member 116 is above valve seat 28 of the mounting member. The valve member can move downwardly onto the valve seat or upwardly away from the valve seat by movement along the shaft 128. The shaft 128 has a bottom 130 with an enlarged, head-like portion 132 thereon. The shaft also has a top 134 with a knob 136 fitted tightly thereon. The knob has an inwardly directed pin 138 on the inside thereof as seen in FIG. 1.

Neck 66 of portion 16 of body 12 has a first slot 140 which extends downwardly from top 68. There is a second slot 142 which communicates with the bottom of slot 140 and extends circumferentially part way about the neck 66. The pin 138 is slidably received within the slots.

The float 110 has a portion, namely a flange 111, positioned to be in the streams of liquid 61, 63 discharged from the tubes 54 and 56. The angled top ends 60, 62 of the tubes and their deflector plates 65 serve as means for directing the flows 61, 63 of directly onto the float flange 111 and towards the top of chamber 64.

Figure 4:
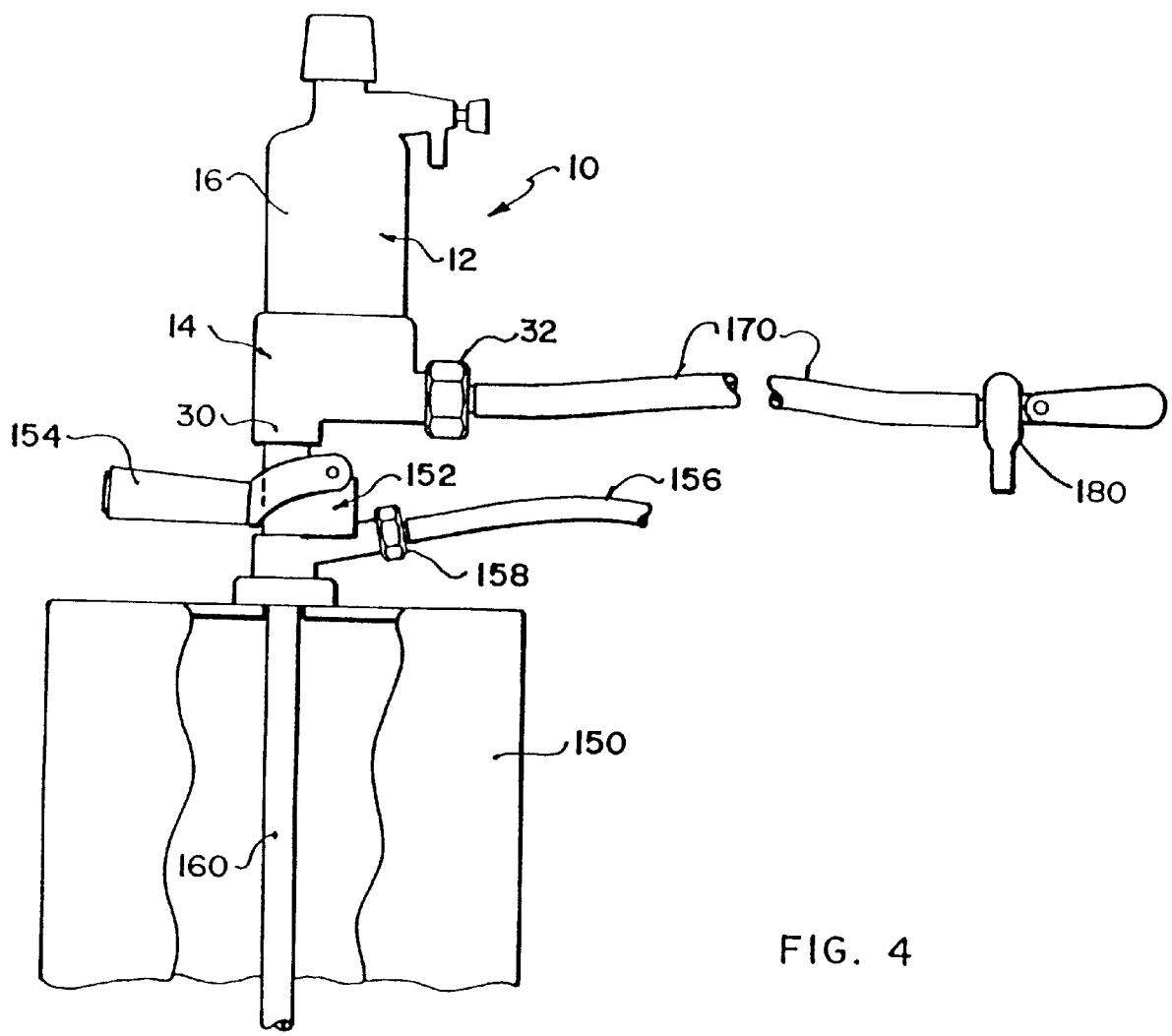
FIG. 4 is a simplified, partly schematic elevation of an apparatus for dispensing beer or other such liquids according to an embodiment of the invention.

Referring to FIG. 4, in use the valve 10 is installed on top of a liquid container such as beer barrel 150. Its female inlet connector 30 is threadedly received on the top of a conventional tapping head 152 provided with a handle 154. A conduit 156 supplies compressed carbon dioxide to the tapping head via connector 158 in the conventional manner. The carbon dioxide from conduit 156 passes through the tapping head into the beer barrel 150 and forces beer upwardly through tube 160 into the tapping head and into the automatic shutoff valve 10. The liquid is discharged from outlet connector 32 of the automatic shutoff valve and passes through a hose 170 to a beer tap 180 or other valve or dispensing device depending upon the nature of the liquid being dispensed.

Operation

After the valve 10 has been installed on top of the tapping head 152 as described above, initially it will be filled with air, so float 110 would be adjacent to the bottom of the chamber 64 with valve member 116 located within the valve seat 28, preventing beer from exiting the valve towards the outlet connector 32. Button 102 is pushed, allowing gas to leave the chamber so it fills with beer. Knob 136 is then rotated slightly clockwise such that pin 136 moves about slot 142 to the bottom of the vertical slot 140. The knob is then pulled upwardly towards the position shown in FIG. 1. This causes enlarged portion 132 of shaft 128 to contact the bottom of sleeve 126 and raise the float so that the valve member 116 is above the valve seat as shown in FIG. 1. Because the float has been lifted off of the valve seat, the beer can flow downwardly through the valve seat and out the connector 32 through hose 170 to tap 180. The air and some foam must be removed by opening the tap for the initial installation only.

Once the chamber has been filled with beer, the float is normally held above the bottom of the chamber by the buoyancy of the float itself Knob 136 is pushed down and rotated so pin 138 is locked in slot 142 to keep pressure in the chamber from forcing shaft 128 and the knob upwards. When the beer is being dispensed, however, there is a tendency sometimes for the float to be sucked down towards the valve seat 28, shown in FIG. 1, as the beer passes outwardly through this opening. However in this improved type of valve the beer being discharged from the tubes 54 and 56, as shown in FIG. 2, impacts upon the flange 111 of the float, keeping the float above the outlet and allowing the flow of liquid to continue.

Once the keg is near empty, gas rises up tube 126 and enters the chamber of the valve, allowing the float to drop and contact the valve seat 28, blocking gases from entering the hose 170. The beer keg is then replaced and the chamber filled with beer by opening the vent 76 and pulling upwardly on the knob 136.

It will be understood by someone skilled in the art that many of the details provided above are by way of example only and are not intended to limit the scope of the invention which is to be interpreted with reference to the following claims.

We claim:

1. An automatic shutoff valve, which is removably connectable a source of liquid, comprising:
   (a) a body having
      (i) an inlet for receiving liquid;
      (ii) an outlet for discharging liquid; and
      (iii) a chamber having a top and a bottom with an opening in fluid communication with said outlet;
   (b) a float having
      (i) impact means on the exterior of the float;
      (ii) a valve member configured to close said chamber bottom opening when said float is at said chamber bottom;
   (c) float guide means for guiding said float towards said chamber bottom opening;
   (d) stream direction means, disposed proximately and below said float, for creating and directing a stream of liquid from said inlet upwardly towards said chamber top to said float impact means so that, in use, said impact means lies in the direction of said upwardly moving stream of liquid and said stream of liquid impacts said impact means and thereby moves and maintains said float away from said bottom opening, wherein said float and said stream direction means are always proximate to each other in all positions of said float.

2. The valve of claim 1, wherein said stream direction means includes a conduit having a discharge end proximate said float, disposed towards said chamber top and remote from said outlet.

3. The valve of claim 2, wherein said impact means is an annular flange.

4. The valve of claim 3, wherein said conduit includes a tube within said chamber extending from said chamber bottom towards said chamber top, and said discharge end is the top end of said tube.

5. The valve of claim 4, wherein said tube top end is angled towards said float.

6. The valve of claim 5, wherein said discharge end has a deflector plate extending inwardly towards said float flange.

7. The valve of claim 6, wherein said conduit includes two said tubes on opposite sides of said float.

* * * * *